United States Patent
Gauthier et al.

[11] Patent Number: 6,114,294
[45] Date of Patent: *Sep. 5, 2000

[54] COPOLYMERIC SCALE INHIBITORS FOR (POLY)PHOSPHATE SCALE CONTROL

[75] Inventors: Francois Gauthier, Verneuil en Halatte, France; Jan Shulman, Newtown, Pa.; Barry Weinstein, Dresher, Pa.; Andrea Keenan, Plymouth Meeting, Pa.; Yves Duccini, Beauvais, France

[73] Assignee: Rohm and Haas Company, Philadelphia, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/071,025

[22] Filed: May 1, 1998

[30] Foreign Application Priority Data

May 9, 1997 [FR] France .................................. 97 05739

[51] Int. Cl.$^7$ ................. C11D 3/37; C11D 3/34; C11D 3/18
[52] U.S. Cl. .................... 510/253; 510/223; 510/230; 510/247; 510/361; 510/434; 510/476; 252/180; 210/701
[58] Field of Search .................... 510/253, 247, 510/223, 230, 361, 434, 476, 533; 252/FOR 245, 180; 210/699, 700, 701

[56] References Cited

U.S. PATENT DOCUMENTS

| | | | |
|---|---|---|---|
| 3,709,815 | 1/1973 | Boothe et al. | 210/701 |
| 3,709,816 | 1/1973 | Walker et al. | 210/701 |
| 3,806,367 | 4/1974 | Lange et al. | 134/3 |
| 3,898,037 | 8/1975 | Lange et al. | 422/16 |
| 3,928,196 | 12/1975 | Persinski et al. | 210/701 |
| 4,216,125 | 8/1980 | Campbell et al. | 252/527 |
| 4,243,545 | 1/1981 | Campbell et al. | 252/140 |
| 4,554,307 | 11/1985 | Farrar et al. | 524/425 |
| 4,711,725 | 12/1987 | Amick et al. | 210/701 |
| 4,828,713 | 5/1989 | McDonald et al. | 210/697 |
| 4,889,637 | 12/1989 | Amjad et al. | |
| 4,931,206 | 6/1990 | McDonald et al. | 252/180 |
| 4,952,324 | 8/1990 | McDonald et al. | 210/697 |
| 5,178,798 | 1/1993 | Jolicoeur | 252/553 |
| 5,277,823 | 1/1994 | Hann et al. | 210/696 |
| 5,282,976 | 2/1994 | Yeung | 210/697 |
| 5,516,432 | 5/1996 | King et al. | 210/701 |
| 5,547,612 | 8/1996 | Austin et al. | 134/22.19 |
| 5,601,723 | 2/1997 | Kirk et al. | 210/701 |
| 5,698,512 | 12/1997 | Austin et al. | 510/475 |

FOREIGN PATENT DOCUMENTS

| | | |
|---|---|---|
| 0271035 | 12/1987 | European Pat. Off. . |
| 0322946 | 12/1988 | European Pat. Off. . |
| 0851022 | 7/1998 | European Pat. Off. . |
| 3743739 | 12/1987 | Germany . |
| 19647030 | 11/1996 | Germany . |
| 83/02607 | 8/1993 | WIPO . |
| 96/35728 | 11/1996 | WIPO . |
| 98/16612 | 4/1998 | WIPO . |

*Primary Examiner*—Yogendra Gupta
*Assistant Examiner*—Christine Ingersoll
*Attorney, Agent, or Firm*—Thomas J. Howell

[57] ABSTRACT

The invention relates to the inhibition of tripolyphosphate and pyrophosphate scales in aqueous systems involving adding to said aqueous system at least one copolymer comprising the following monomers in polymerized form:

(I) 50–80% by weight of one or more weak acids; (II) 2–50% by weight of one or more strong acids;

(III) 0–30% by weight of one or more monoethylenically unsaturated $C_4$–$C_8$ dicarboxylic acids; and

(IV) 0–30% by weight of one or more monomethylenically unsaturated monomers polymerisable with (I), (II) and (III);

wherein the total of monomers (I), (II), (III), and (IV) equals 100% by weight of copolymer.

The invention is particularly suited to the inhibition of tripolyphosphate and pyrophosphate scales which occur as a result of using low phosphate (STPP) containing detergent formulations.

12 Claims, 6 Drawing Sheets

Fig. 4. THE INHIBITION OF CALCIUM TRIPOLYPHOSPHATE BY AN AMPS CONTAINING TERPOLYMER AS A FUNCTION OF A 'HYDROPHOBIC' COMONOMER

Fig.5. THE INHIBITION OF CALCIUM TRIPOLYPHOSPHATE BY AN AMPS CONTAINING TERPOLYMER AS A FUNCTION OF MOLECULAR WEIGHT

COPOLYMERIC SCALE INHIBITORS FOR (POLY)PHOSPHATE SCALE CONTROL

The present invention relates to the inhibition of (poly) phosphate salt scale in aqueous systems.

It is well known that in hard water areas high concentrations of magnesium and calcium ions can lead to the formation of insoluble calcium and magnesium carbonate deposits (scaling) on washed articles. This is visible, as a white deposit, particularly on glassware when such articles are washed in automatic dishwashing machines, and also on machine parts especially heater elements. Similar precipitation problems also occur in laundry washing, these cause the fabric to become stiff and rough to the touch and give coloured fabrics a faded appearance. Tap water with relatively high water hardness and the use of insufficient water softening chemicals increase the problem dramatically. Other factors involved in causing scaling are temperature (more scaling occurs at higher temperatures) and pH (higher pH also increases scaling). Since the mid 1960's, sodium tripolyphosphate (STPP) has been used in large quantities in most detergent formulations as a "builder"; that is an agent which is able to sequester positive cations such as magnesium and calcium in the washing solution and prevent them from depositing as salts (carbonate, silicate etc.) on the items being washed.

However, it is now known that the presence of phosphate, for example in the form of STPP, in lakes and rivers serves as a nutrient for algae growth and this results in a deterioration of water quality. These environmental concerns have lead to the removal of STPP in detergent formulations and their replacement with other sequestering compounds. Unfortunately, the changes that occur in the washing process without inclusion of phosphate are more complex than those expected from the simple decrease in sequestration capacity of the detergent matrix. The multi-purpose capabilities of the STPP in the areas of emulsification of oily particles, stabilisation of solid soil suspension, peptisation of soil agglomerates, neutralisation of acid soils, etc. are all key to obtaining an excellent wash end result.

To try to maintain as many of the desirable properties of STPP as possible, whilst at the same time limiting its environmental impact, reduced STPP levels are used. However, this in itself brings new scaling problems. When high levels of STPP are used in the wash bath of dishwashing and laundry washing machines, the predominant species formed in the aqueous system is a water soluble 1:1 metal ion:STPP complex (eg. $CaP_3O_{10}^{-3}$). As STPP levels decrease, water insoluble calcium and magnesium salts of tripolyphosphate (eg. $Ca_5(P_3O_{10})_2$) and pyrophosphate (eg. $Ca_2P_4O_7$) are formed which consequently precipitate from the aqueous system.

Prior art documents are known, for example U.S. Pat. No. 3,806,367, U.S. Pat. No. 3,928,196, and U.S. Pat. No. 3,898,037, which address the problem of controlling scale in STPP free systems. However, there is no teaching of any effective way to control the (poly)phosphate scales which are formed using low-STPP levels (ie. through the use of "Ultra" or "Compact" detergent formulations) where the concentration of the STPP in the wash bath is, for example, below 1500 ppm. The precise amount of scale observed will depend upon the concentration of divalent cation in the wash bath. For comparison, typical high-STPP wash bath concentrations in current commercial use, have greater than 2000 ppm of STPP.

The term "(poly)phosphate scale" used herein refers to phosphate, tripolyphosphate and pyrophosphate scales collectively. Also, the term "copolymer" is used to mean polymers containing at least one strong acid and at least one weak acid, as well as polymers containing one or more additional types of monomers.

The problem addressed by the present invention, therefore, is to provide a method of controlling (poly) phosphate salt scale in aqueous systems and to also provide detergent formulations which have good anti-filming performance characteristics when used in machine dishwashing detergents and good anti-encrustation and anti-deposition performance characteristics when used in laundry washing detergents.

Accordingly, the present invention provides a method of controlling (poly)phosphate scale comprising treating the aqueous system with at least one copolymer comprising the following monomers in polymerized form:

(I) 50–98% by weight of one or more weak acid;

(II) 2–50% by weight of one or more strong acid;

(III) 0–30% by weight of one or more monoethylenically unsaturated $C_4$–$C_8$ dicarboxylic acid; and (IV) 0–30% by weight of one or more monoethylenically unsaturated monomers polymerizable with (I), (II), and (III);

wherein the total of monomers (I), (II), (III) and (IV) equals 100% by weight of copolymer.

The invention further provides a method of controlling (poly)phosphate scale in aqueous systems comprising treating the aqueous system with at least one copolymer comprising polymerized units of the following polymers:

(I) 50–98% by weight of one or more monoethylenically unsaturated $C_3$ to $C_6$ monocarboxylic acid;

(II) 2–50% by weight of one or more unsaturated sulphonic acid;

(III) 0–30% by weight of one or more monoethylenically unsaturated $C_4$ to $C_8$ dicarboxylic acid;

(IV) 0–30% by weight of one or more monoethylenically unsaturated monomer polymerizable with (I), (II) and (III); wherein the total of monomers (I), (II), (III) and (IV) equals 100% by weight of the copolymer.

Preferably, the copolymer comprises polymerized units of the following monomers:

(I) 50–90% by weight of one or monoethylenically unsaturated $C_3$–$C_6$ monocarboxylic acid;

(II) 10–50% by weight of unsaturated sulphonic acid;

(III) 0–30% by weight of one or more monoethylenically unsaturated $C_4$–$C_8$ dicarboxylic acid; and (IV) 0–30% by weight of one or more monoethylenically unsaturated monomer polymerizable with (I), (II) and (III), wherein the total of monomers (I), (II) (III) and (IV) equals 100% by weight of the copolymer.

Advantageously, the copolymer of the present invention comprises polymerized units of the following monomers:

(I) 60–90% by weight of one or monoethylenically unsaturated $C_3$–$C_6$ monocarboxylic acid (II) 10–40% by weight of unsaturated sulphonic acid;

(III) 0–30% by weight of one or more monoethylenically unsaturated $C_4$–$C_8$ dicarboxylic acid; and (IV) 0–30% by weight of one or more monoethylenically unsaturated monomer polymerizable with (I), (II) and (III), wherein the total of monomers (I), (II) (III) and (IV) equals 100% by weight of the copolymer.

A copolymer with particularly good (poly)phosphate scale inhibition properties comprises polymerized units of the following monomers:

(I) 77% by weight of one or monoethylenically unsaturated $C_3$–$C_6$ monocarboxylic acid (II) 23% by weight of unsaturated sulphonic acid.

The monoethylenically unsaturated $C_3$–$C_6$ monocarboxylic acid is preferably (meth)acrylic acid.

The unsaturated sulphonic acid monomer is preferably one of the following: 2-acrylamido methyl-1-propanesulfonic acid, 2-methacrylamido-2-methyl-1-propanesulphonic acid, 3-methacrylamido-2-hydroxypropanesulphonic acid, allylsulphonic acid, methallylsulphonic acid, allyloxybenzenesulphonic acid, methallyloxybenzenesulphonic acid, 2-hydroxy-3-(2-propenyloxy)propanesulphonic acid, 2-methyl-2-propene-1-sulphonic acid, styrene sulphonic acid, vinylsulphonic acid, 3-sulphopropyl acrylate, 3-sulphopropyl methacrylate, sulphomethylacrylamide, sulphomethylmethacrylamide, and water soluble salts thereof.

The monoethylenically unsaturated $C_4$–$C_8$ dicarboxylic acid is preferably maleic acid, and the monoethylenically unsaturated monomer polymerizable with (I), (II) and (III) is preferably selected from one or more of $C_1$–$C_4$ alkyl esters of (meth)acrylic acid; $C_1$–$C_4$ hydroxalkyl esters of (meth) acrylic acid; acrylamide; alkyl substituted acrylamide; N,N-dialkyl substituted acrylamides; sulphonated alkyl acrylamides; vinylsulphonates; vinyl sulphonic acid; (meth) allylsulphonic acid; vinylphosphonic acid; vinyl actetate; allyl alcohols; sulphonated allyl alcohols, acrylonitrile; N-vinylpyrrolidone; N-vinylformamide; N-Vinylimidazole; and N-vinylpyridine.

The weight average molecular weight of the copolymer according to the present invention is from 3,000 to 50,000 and preferably from 4,500 to 35,000.

The present invention also provides a detergent formulation comprising at least one copolymer comprising polymerized units of the following monomers:

(I) 50–98% by weight of one or more monoethylenically unsaturated $C_3$ to $C_6$ monocarboxylic acid;

(II) 2–50% by weight of one or more unsaturated sulphonic acid;

(III) 0–30% by weight of one or more monoethylenically unsaturated $C_4$ to $C_8$ dicarboxylic acid;

(IV) 0–30% by weight of one or more monoethylenically unsaturated monomer polymerizable with (I), (II) and (III); wherein the total of monomers (I), (II), (III) and (IV) equals 100% by weight of the copolymer.

The invention will now be further illustrated by the following examples.

General Screening Method

Polymers according to the present invention were evaluated for calcium tripolyphosphate precipitation inhibition in a phosphate containing automatic dishwashing detergent formulation, and by titrating a 750 ppm STPP solution with incremental levels of water hardness (2/1 $Ca^{++}/Mg^{++}$) at elevated temperatures (55° C.) and a fixed polymer concentration (100 ppm). The onset of turbidity was measured utilizing a Brinkmann PC 701 Probe Colorimeter (520 nm), and the experiment was concluded with the observation of a visible precipitate.

Detergent Formulations

TABLE 1

Detergent Fomulations

| Component | Det. Form 1 Concentration (%) | Det. Form 2 Concentration (%) |
|---|---|---|
| STPP | 20.0 | 35.0 |
| Soda Ash | 30.0 | 22.0 |
| Sodium disilicate (Britesil H20) | 12.0 | 12.0 |
| Sodium citrate dihydrate | 10.0 | — |
| Sodium perborate .4H$_2$O | 7.5 | 7.5 |
| Bleach activator (TAED)* | 2.5 | 2.5 |
| Surfactant (SLF-18) | 3.5 | 3.5 |
| Protease | 1.0 | 1.0 |
| Amylase | 0.5 | 0.5 |
| Sodium sulphate | 9.0 | 14.0 |
| Polymer | 4.0 | 2.0 |

*TAED is tetra acetyl ethylene diamine

Detergent formulation 1 is a low STPP containing formulation whereas detergent formulation 2 contains a high percentage of STPP.

Key to acronyms used herein:

Mw=weight average molecular weight. All molecular weights quoted are weight average molecular weight unless otherwise specified.

AA=Acrylic acid

Mal=Maleic acid

AMPS=2-acrylamido-2-propane sulphonic acid

TBAM=tertbutylacrylamide

TOAM=tertoctylacrylamide

DMAM=Dimethylacrylamide

EA=Ethyl acrylate

HPA=Hydroxypropyl acrylate

STY=Styrene

SMAS=Sodium methallyl sulphonate.

MAA=Methylacrylic acid.

Dishwashing Conditions

The anti-filming performance in dishwashing applications of polymers according to the present invention were also tested using conventional procedures; under one or either of the following conditions, (A) or (B):

(A) US Washing Conditions
Dishwashing machine: Whirlpool model DU 940
Water Hardness: 300 ppm as calcium carbonate (Ca/Mg= 3.5:1)
No food soil
Normal Programme (50° C.)
No Rinse Aid
Dishwares: glasses
Cycles: 5

| Filming Scores: | 0.0 = No visible film | 2 = Intermediate |
|---|---|---|
| | 0.5 = Barely Perceptible | 3 = Moderate |
| | 1.0 = Slight | 4 = Heavy |

(B) European Washing Conditions
Dishwashing machine: Miele Deluxe model G590 SC
Water Hardness: 600 ppm as calcium carbonate (Ca/Mg= 3.5:1)
No food soil
Normal Programme (65° C.)
No Rinse Aid
Dishwares: glasses
Cycles: 5

| Filming Scores: | 0.0 = No visible film | 2 = Intermediate |
|---|---|---|
| | 0.5 = Barely Perceptible | 3 = Moderate |
| | 1.0 = Slight | 4 = Heavy |

Figure 1:
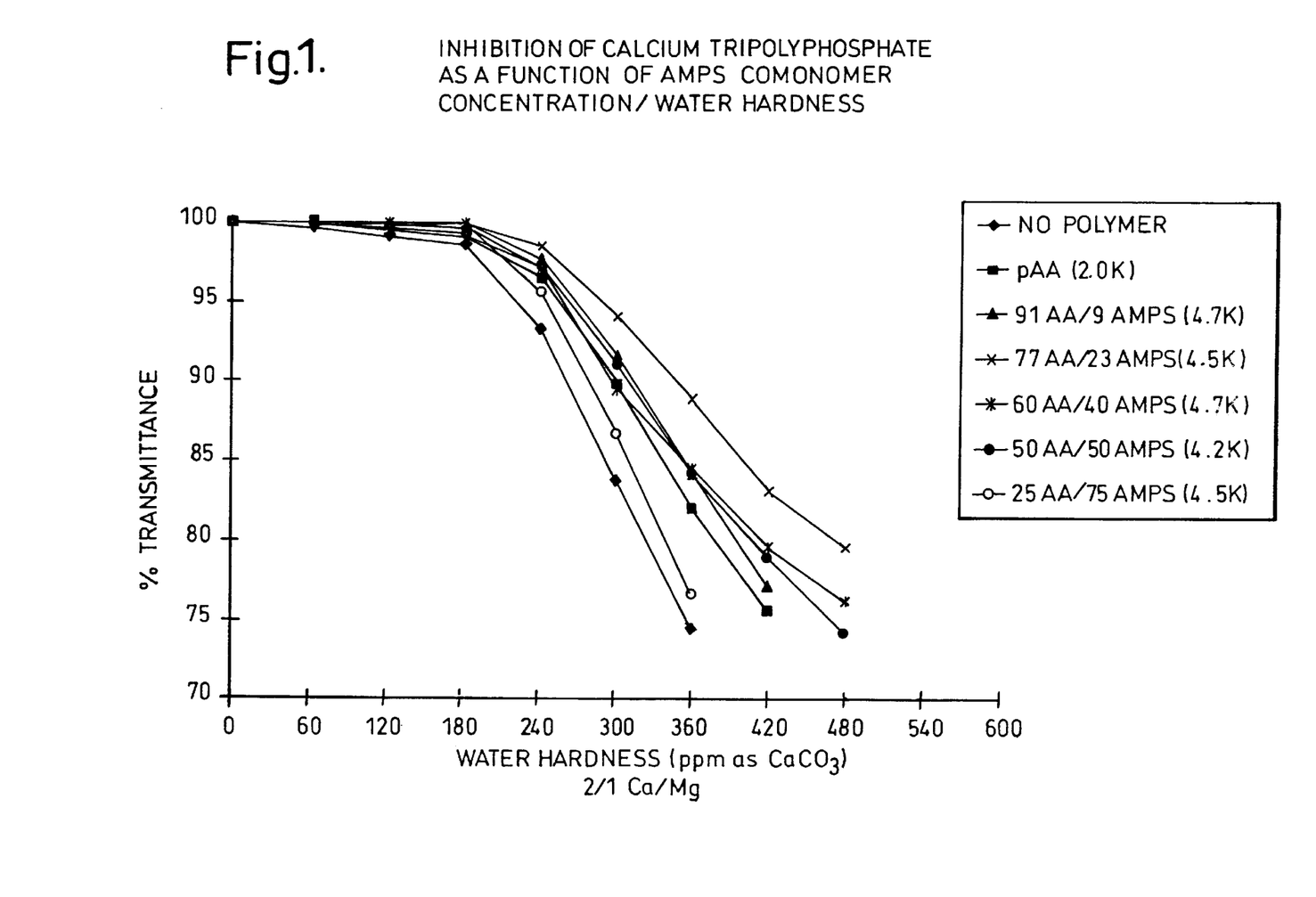
FIG. 1 shows the inhibition of calcium tripolyphosphate as a function of AMPS comonomer concentration.

EXAMPLE 1
The Effect of AMPS Containing Copolymer on the Inhibition of Calcium Tripolyphosphate Copolymer containing solutions were evaluated according to the general screening method described above to give the results shown in FIG. 1. In summary, the calcium tripolyphosphate antiprecipitation improves as the level of AMPS in the copolymer increases up to 50% AMPS, at levels greater than 50% AMPS, the inhibition of tripolyphosphate scale starts to decrease.

EXAMPLE 2
The Effect of AMPS Containing Copolymer on Filming.

Copolymers according to Example 1 were included in various automatic dish washing detergent formulations and were tested under wash conditions (A). Table 2 shows the glass filming scores obtained; these confirm the observation that increasing AMPS levels up to 50% increases inhibition of (poly)phosphate scale.

TABLE 2

| Polymer | Molecular Weight | Filming Score Det. Form 1 | Filming Score Det. Form 2 |
|---|---|---|---|
| No Polymer | — | 3.5 | 3.0 |
| 100AA (Comparative) | 2,000 | 1.5 | 1.75 |
| 100AA (Comparative) | 4,500 | 1.1 | 2.0 |
| 90 AA/10 Mal (Comp) | 3,200 | 1.3 | 1.75 |
| 80 AA/20 Mal (Comp) | 16,000 | 1.2 | 1.3 |
| 70 AA/30 Mal (Comp) | 30,000 | 1.0 | 2.0 |
| 50 AA/50 Mal (Comp) | 3,500 | 1.1 | 1.2 |
| 50 AA/50 Mal (Comp) | 25,000 | 1.1 | 2 |
| 30 AA/70 Mal (Comp) | 5,500 | 1.4 | 1.2 |
| 95 AA/5 EA (Comp) | 2,500 | 1.75 | 2.5 |
| 80 AA/20 EA (Comp) | 4,300 | 1.25 | 1.1 |
| 70 AA/30 MAA (Comp) | 3,500 | 1.1 | 1.0 |

TABLE 2-continued

| Polymer | Molecular Weight | Filming Score Det. Form 1 | Filming Score Det. Form 2 |
|---|---|---|---|
| 77 AA/23 AMPS | 4,500 | 0.5 | 0.6 |
| 60 AA/40 AMPS | 10,000 | 0.5 | 0.3 |
| 77 AA/23 SMAS | 6,600 | 0.8 | 0.9 |
| 60 AA/40 SMAS | 3,870 | 0.3 | |

Figure 2:
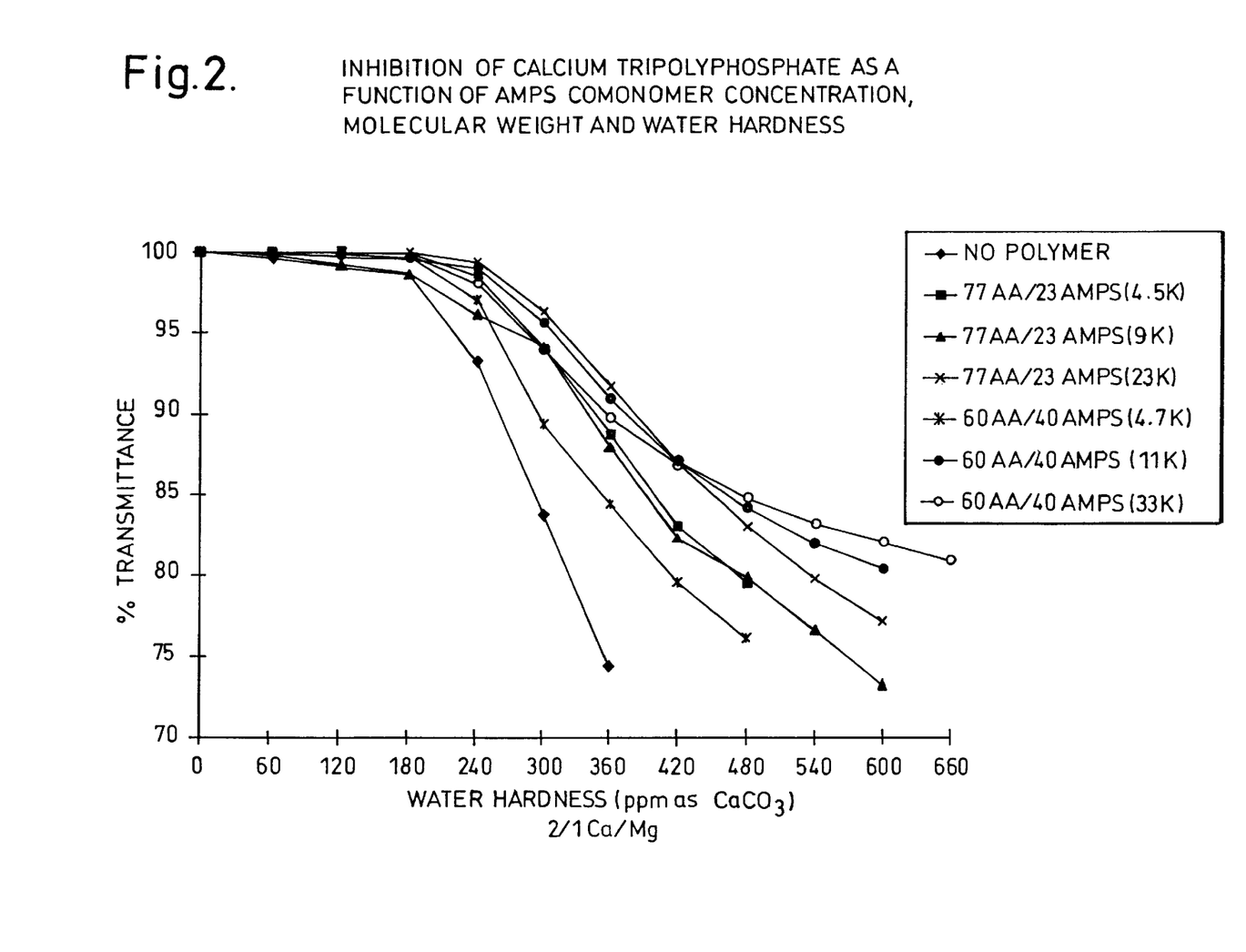
FIG. 2 shows the inhibition of calcium tripolyphosphate as a function of AMPS comonomer concentration and molecular weight.

EXAMPLE 3
The Effect of the Molecular Weight of AMPS Containing Copolymers on the Inhibition of Calcium Tripolyphosphate FIG. 2 focuses on the effect of molecular weight of the copolymers at two different AA/AMPS molar ratios. In both cases, increasing the molecular weight of the copolymer significantly enhances the tripolyphosphate antiprecipitation properties of the copolymer. The particle size of the precipitated scale was visibly smaller (higher transmittance) with higher molecular weight analogues.

Figure 3:
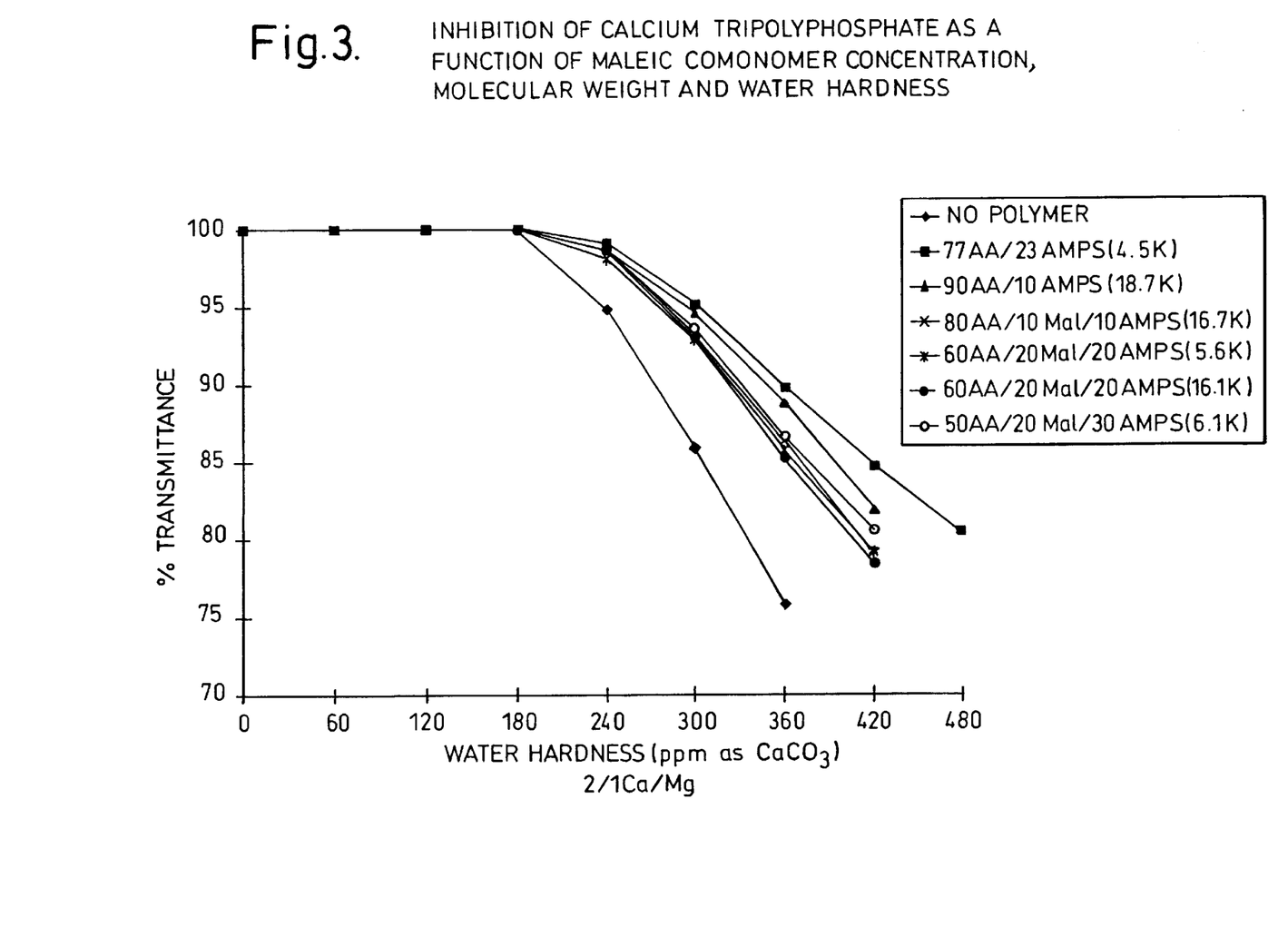
FIG. 3 shows the inhibition of calcium tripolyphosphate as a function of maleic comonomer concentration and molecular weight.

EXAMPLE 4
The Effect of AMPS Containing Terpolymers on the Inhibition of Calcium Tripolyphosphate FIG. 3 shows that AA/AMPS/X containing terpolymers (where X is anther monomer unit which is not AA or AMPS) have a greater efficacy in (poly)phosphate scale inhibition with increasing AMPS levels, when the polymers have similar molecular weights.

Figure 4:
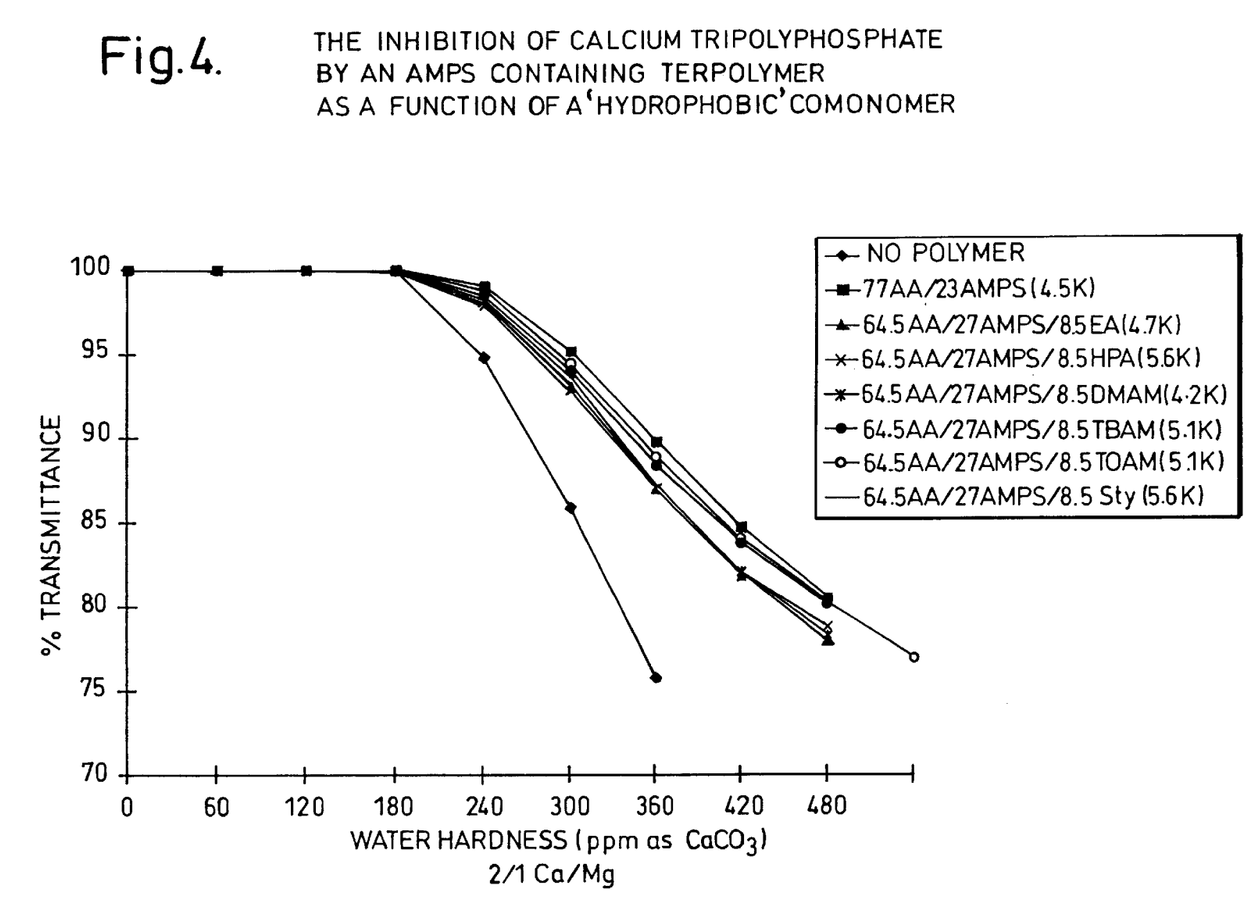
FIG. 4 shows the inhibition of calcium tripolyphosphate by an AMPS containing terpolymer as a function of a "hydrophobic" comonomer.

EXAMPLE 5
The Effect of Hydrophobically Modified AMPS Containing Terpolymers on the Inhibition of Calcium Tripolyphosphate The desired inhibition of (poly)phosphate scale is also observed for AA/AMPS copolymers which have been modified by the incorporation of a third "hydrophobic" monomer; see the results illustrated in FIG. 4.

EXAMPLE 6
The Effect of Hydrophobically Modified AMPS Containing Copolymers on Filming The results of Example 6 are also confirmed in Example 7, see Table 3 below.

TABLE 3

| Polymer | Molecular Weight | Filming Score Det. Form 1 | Filming Score Det. Form 2 |
|---|---|---|---|
| No Polymer | — | 3.5 | 3.0 |
| 100AA (Comparative) | 4,500 | 1.1 | 2.0 |
| 90 AA/10 Mal (Comp) | 3,200 | 1.3 | 1.75 |
| 70 AA/30 Mal (Comp) | 30,000 | 1.0 | 2.0 |
| 50 AA/50 Mal (Comp) | 25,000 | 1.1 | 2 |
| 30 AA/70 Mal (Comp) | 5,500 | 1.4 | 1.2 |
| 95 AA/5 EA (Comp) | 2,500 | 1.75 | 2.5 |
| 70 AA/30 MAA (Comp) | 3,500 | 1.1 | 1.0 |
| 62 AA/23 AMPS/ 15 TBAM | 24,800 | 0.4 | 0.5 |
| 64.5 AA/27 SMAS/ 8.5 TBAM | 5,130 | 0.8 | |
| 64.5 AA/27 SMAS/ 8.5 TBAM | 4,120 | 1.1 | |

Figure 5:
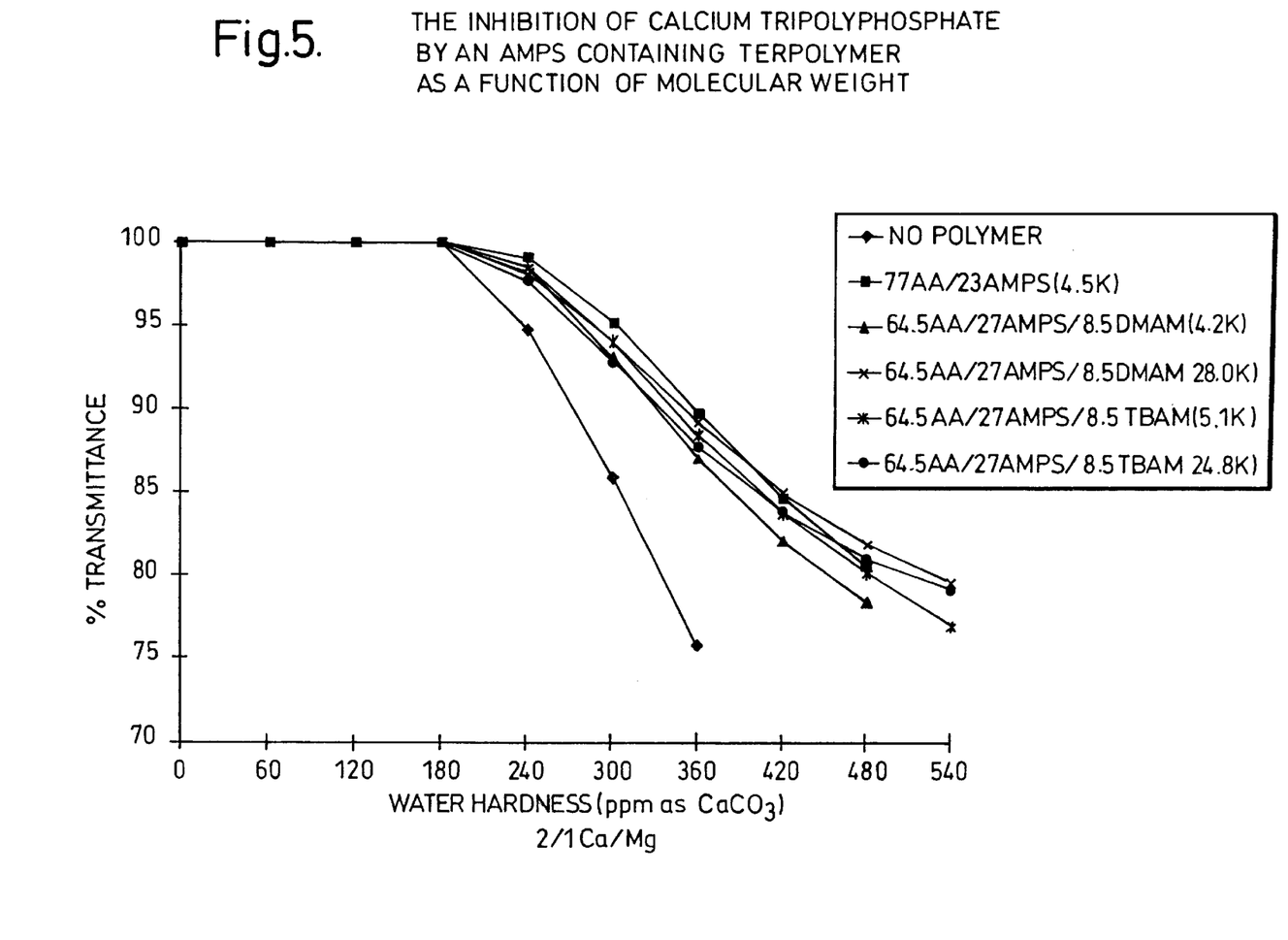
FIG. 5 shows the inhibition of calcium tripolyphosphate by an AMPS containing terpolymer as a function of molecular weight.
Figure 6:
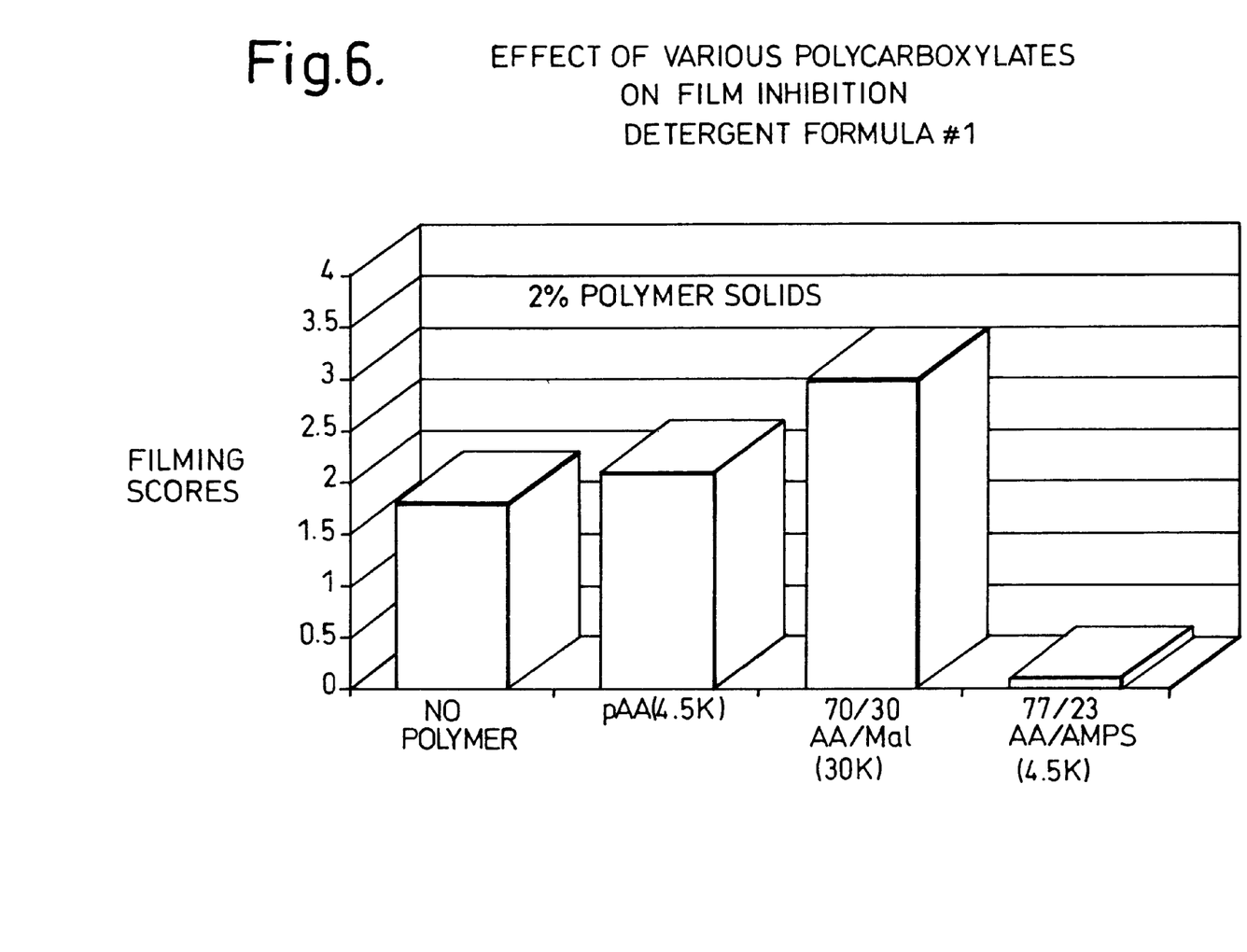
FIG. 6 shows the effect of various polycarboxylates on film inhibition.

EXAMPLE 7
The Effect of Molecular Weight On Hydrophobically Modified AMPS Containing Terpolymers on the Inhibition of Calcium Tripolyphosphate Inhibition of (poly)phosphate scale also increases with increasing the molecular weight of AMPS containing copolymers which have been modified with a hydrophobic monomer. The results are shown in FIG. 5

We claim:

1. Method of controlling scale in aqueous systems comprising adding to the aqueous system at least one copolymer comprising polymerized units of the following monomers:
   (I) 50–98% by weight of one or more weak acid;
   (II) 2–50% by weight of one or more unsaturated sulphonic acid selected from the group consisting of 3-methacrylamido-2-hydroxy-propanesulphonic acid, allylsulphonic acid, methallylsulphonic acid, allyoxybenzenesulphonic acid, methallyoxybenzenesulphonic acid, 2-hydroxy-3-(2-propenyloxy)propanesulphonic acid, 2-methyl-2-propene-1-sulphonic acid, styrene sulphonic acid, and vinylsulphonic acid and water soluble salts thereof;
   (III) 0–30% by weight of one or more monoethylenically unsaturated $C_4$–$C_8$ dicarboxylic acid; and
   (IV) 0–30% by weight of one or more monoethylenically unsaturated monomers polymerizable with (I), (II) and (III);
   wherein the total of monomers (I), (II), (III) and (IV) equals 100% by weight of copolymer; and further wherein the scale being controlled is selected from the group consisting of tripolyphosphate and pyrophosphate.

2. Method according to claim 1 wherein the at least one copolymer comprises polymerized units of the following monomers:
   (I) 50–98% by weight of one or more weak acids selected from the group consisting of monoethylenically unsaturated $C_3$ to $C_6$ monocarboxylic acid;
   (II) 2–50% by weight of one or more unsaturated sulphonic acid selected from the group consisting of 3-methacrylamido-2-hydroxy-propanesulphonic acid, allylsulphonic acid, methallylsulphonic acid, allyoxybenzenesulphonic acid, methallyoxybenzenesulphonic acid, 2-hydroxy-3-(2-propenyloxy)propanesulphonic acid, 2-methyl-2-propene-1-sulphonic acid, styrene sulphonic acid, and vinylsulphonic acid and water soluble salts thereof;
   (III) 0–30% by weight of one or more monoethylenically unsaturated $C_4$ to $C_8$ dicarboxylic acid;
   (IV) 0–30% by weight of one or more monoethylenically unsaturated monomer polymerizable with (I), (II) and (III); wherein the total of monomers (I), (II), (III) and (IV) equals 100% by weight of the copolymer.

3. Method according to claim 1 or 2 wherein the copolymer comprises polymerized units of the following monomers:
   (I) 50–90% by weight of one or weak acids selected from the group consisting of monoethylenically unsaturated $C_3$–$C_6$ monocarboxylic acid;
   (II) 10–50% by weight of one or more unsaturated sulphonic acid selected from the group consisting of 3-methacrylamido-2-hydroxy-propanesulphonic acid, allylsulphonic acid, methallylsulphonic acid, allyoxybenzenesulphonic acid, methallyoxybenzenesulphonic acid, 2-hydroxy-3-(2-propenyloxy)propanesulphonic acid, 2-methyl-2-propene-1-sulphonic acid, styrene sulphonic acid, and vinylsulphonic acid, and water soluble salts thereof;
   (III) 0–30% by weight of one or more monoethylenically unsaturated $C_4$–$C_8$ dicarboxylic acid; and
   (IV) 0–30% by weight of one or more monoethylenically unsaturated monomer polymerizable with (I), (II) and (III), wherein the total of monomers (I), (II) (III) and (IV) equals 100% by weight of the copolymer.

4. Method according to claim 1 wherein the copolymer comprises polymerized units of the following monomers:
   (I) 60–90% by weight of one or monoethylenically unsaturated $C_3$–$C_6$ monocarboxylic acid
   (II) 10–40% by weight of an unsaturated sulphonic acid selected from the group consisting of 3-methacrylamido-2-hydroxy-propanesulphonic acid, allylsulphonic acid, methallylsulphonic acid, allyoxybenzenesulphonic acid, methallyoxybenzenesulphonic acid, 2-hydroxy-3-(2-propenyloxy)propanesulphonic acid, 2-methyl-2-propene-1-sulphonic acid, styrene sulphonic acid, and vinylsulphonic acid and water soluble salts thereof;
   (III) 0–30% by weight of one or more monoethylenically unsaturated $C_4$–$C_8$ dicarboxylic acid; and
   (IV) 0–30% by weight of one or more monoethylenically unsaturated monomer polymerizable with (I), (II) and (III), wherein the total of monomers (I), (II) (III) and (IV) equals 100% by weight of the copolymer.

5. Method according to claim 2 wherein the monoethylenically unsaturated $C_3$–$C_6$ monocarboxylic acid is selected from the group consisting of one or more of acrylic acid and methacrylic acid.

6. Method according to claim 1 wherein the monoethylenically unsaturated $C_4$–$C_8$ dicarboxylic acid is maleic acid, and the monoethylenically unsaturated monomer polymerizable with (I), (II) and (III) is selected from the group consisting of $C_1$–$C_4$ alkyl esters of (meth)acrylic acid; $C_1$–$C_4$ hydroxyalkyl esters of (meth)acrylic acid; acrylamide; alkyl substituted acrylamide; N,N-dialkyl substituted acrylamides; sulphonated alkyl acrylamides; vinylphosphonic acid; vinyl acetate; allyl alcohols, sulphonated allyl alcohols; acrylonitrile; N-vinylpyrrolidone; N-vinylformamide; N-vinylimidazole; and N-vinylpyridine.

7. Method according to claim 1 wherein the weight average molecular weight of the copolymer according to the present invention is from 3,000 to 50,000.

8. Method according to claim 1 wherein the weight average molecular weight of the copolymer is from 4500 to 35,000.

9. Method according to claim 1 wherein the scale being controlled is tripolyphosphate.

10. Method according to claim 1 wherein the copolymer is added to a machine dishwashing and/or laundry detergent formulation used in the aqueous system and the aqueous system is a wash bath of a dishwashing and/or laundry washing machine.

11. Method according to claim 1 wherein the copolymer consists essentially of polymerized units of the following monomers:
   (I) 60–90% by weight of one or monoethylenically unsaturated $C_3$–$C_6$ monocarboxylic acid; and
   (II) 10–40% by weight of an unsaturated sulphonic acid selected from the group consisting of 3-methacrylamido-2-hydroxy-propanesulphonic acid, allylsulphonic acid, methallylsulphonic acid, allyoxybenzenesulphonic acid, methallyoxybenzenesulphonic acid, 2-hydroxy-3-(2-propenyloxy)propanesulphonic acid, 2-methyl-2-propene-1-sulphonic acid, styrene sulphonic acid, and vinylsulphonic acid and water soluble salts thereof.

12. Method according to claim 1 wherein the copolymer consists essentially of polymerized units of the following monomers:
- (I) 62–65% by weight of one or monoethylenically unsaturated $C_3$–$C_6$ monocarboxylic acid;
- (II) 23–27% by weight of an unsaturated sulphonic acid selected from the group consisting of 3-methacrylamido-2-hydroxy-propanesulphonic acid, allylsulphonic acid, methallylsulphonic acid, allyoxybenzenesulphonic acid, methallyoxybenzenesulphonic acid, 2-hydroxy-3-(2-propenyloxy)propanesulphonic acid, 2-methyl-2-propene-1-sulphonic acid, styrene sulphonic acid, and vinylsulphonic acid and water soluble salts thereof; and
- (III) 8–15% by weight of one or more monoethylenically unsaturated monomer polymerizable with (I) and (II).

* * * * *